United States Patent

[11] 3,595,465

| [72] | Inventor | Vincent L. Vaillancourt<br>Livingston, N.J. |
|---|---|---|
| [21] | Appl. No. | 859,592 |
| [22] | Filed | Sept. 19, 1969 |
| [45] | Patented | July 27, 1971 |
| [73] | Assignee | C. R. Bard, Inc.<br>Murray Hill, N.J. |

[54] AUTOCLAVABLE PACKAGE
6 Claims, 2 Drawing Figs.

[52] U.S. Cl.................................................. 229/3.5,
206/63.2 R
[51] Int. Cl................................................B65d 33/16,
A61b 19/02
[50] Field of Search...........................................229/3.5, 62;
206/46 SG, 52 S, 63.2 R

[56] References Cited
UNITED STATES PATENTS
3,410,393  11/1968  Lee............................... 206/63.2 X
3,410,395  11/1968  Sellers.......................... 206/63.2

*Primary Examiner*—David M. Bockenek
*Attorney*—W. Saxton Seward

ABSTRACT: A sealed package for surgical devices such as catheters, intravenous devices, instruments and the like, formed by heat sealing marginally an upper laminated web of plastic materials selected for their autoclavability and a lower web of paper having controlled porosity to permit steam and/or gas sterilization.

PATENTED JUL 27 1971

3,595,465

INVENTOR.
Vincent L. Vaillancourt
BY
W. Daylon Seward
Attorney

AUTOCLAVABLE PACKAGE

This invention relates to a package of the character indicated, one side of which is paper and the other side is a clear film (laminated) which can be heat sealed marginally to enclose an item requiring sterilization which can be sterilized by air or gas (ethylene oxide) sterilizing techniques or by autoclaving (flash or standard process); which retains its dimensional stability without distortion or wrinkling when autoclaved; and with sufficient porosity to prevent rupturing of the film, paper or seal by ballooning due to pressure differences, while preventing inward migration of bacteria.

To be autoclavable the upper laminated web must be able to withstand a temperature of 275° F. Without loss of strength or change in dimensions or form. Most commonly used packaging materials including polyethylene (PE) alone, polypropylene (PP) alone, nylon, polyvinyl acetate (PVA) alone, and nylon-PE, laminated, fail to meet the stated requirements in one or more respects, as by melting, losing strength, separations of laminations, blistering and/or warping, Even when the enclosure of the goods is not mechanically impaired, the appearance may be such that the packaging is not deemed satisfactory.

Figure 1:
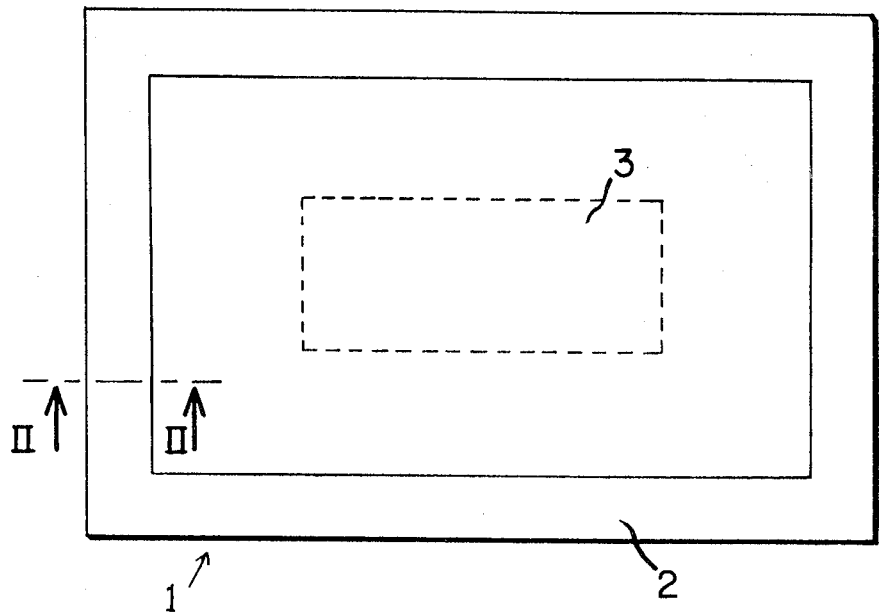
Figure 2:
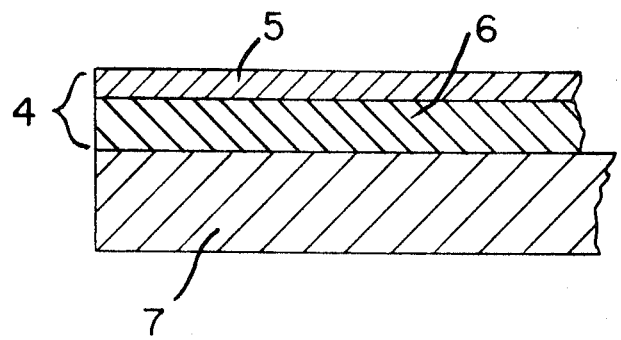

A practical embodiment of the invention is shown in the accompanying drawing wherein:

FIG. 1 represents a plan view of a sealed package, and
FIG. 2 represents a greatly enlarged section on the line II-II of FIG. 1.

Referring to the drawing, the package 1 is heat sealed peripherally, as indicated at 2, to enclose an object 3 requiring sterile packaging.

According to the present invention the upper laminated web 4 is made of polyethylene terephthalate (Mylar) film 5 to which is laminated or coated heat-sealable film of polypropylene or such other thermoplastic material 6 which is sufficiently high-temperature resistant that, a the sterilizing temperatures and times required, it will not adhere to the product being sterilized. High molecular weight PVA is another such material. The thickness of the "Myler" may suitably be on the order of one half mil, and the PP from 1 to 1.5 mils or PVA on the order of 0.2 mil. The function of the second coating or lamination is to make the web heat sealable, while obtaining the benefit of "Mylar's " dimensional stability. The expression "high-temperature resistant" is used herein with the restricted definition given above.

The paper side of the package is made of a high porosity paper 7, the density of which does not exceed 25 on a Gurley densitometer and is as low as possible consistent with the paper's ability to prevent outward migration of bacteria from the outer surface to the inner surface, i.e., the pore size may not exceed two microns. The paper must also be heat sealable to the facing surface of the upper laminated web. One paper which meets these requirements, having a porosity of 20, is sold as "-Sterilizable Kraft No. 40I-WMF-WS" by Phoenix Products Company of Milwaukee, Wisc.; another is International Paper No. 0660-0400. Said papers have a thickness of about 4 mils.

Packages formed by use of the above materials, heat sealed marginally to enclose sterilizable articles, have been tested by autoclaving for periods of 7 to 10 minutes at temperatures of 270° F. to 280° F. and for periods of 30 to 60 minutes at 250° F., with excellent results, all seals remaining intact and the packages being undistorted with no sign of deterioration or fault. The sealing may be effected by rollers at heat-sealing temperatures of 325° F. to 450° F. having a surface velocity of 40 to 150 feet per minute. The sealing contact time has been as low as one seventh of a second (140 milliseconds), in experimental runs, with satisfactory seals resulting.

It may be noted that the micro-organisms against which the sterilization is directed have a minimum absolute particle size of approximately 0.2 microns. In actual practice, their size is closer to 2 microns, since they migrate or are carried about by other particles such as dust in he air, therefore paper having an effective porosity of 2 microns or smaller will act as an acceptable bacteria barrier. Tests have established the fact that the kraft paper specified above, or its equivalent, will meet these requirements. The dimensional stability of the packages here described. The dimensional stability of the packages here described, evaluated in terms of shrinkage, is such that the shrinkage does not exceed 3 percent at 300° F. (a temperature higher than normal autoclaving temperature).

It has been found that if shrinkage exceeds 3 percent when the film is heated to 300° F. for 5 minutes, "poppers" occur; that is, a physical rupture takes place in the package between the film and paper webs. This is apparently due to excessive sheer stress on the seal and thereby destroys package sterility. The frequency of these "poppers" increases as shrinkage increases. This has been correlated to actual autoclaving cycles when it has been shown that seal failure "poppers" will occur if shrinkage exceeds this value.

What I claim is:

1. A sterilizable heat-sealed package for articles requiring sterile packaging comprising an upper laminated or coated clear web of a dimensionally stable plastic material and a high temperature resistant heat sealable material, and a lower web of paper having a density no greater than 25 on the Gurley densitometer and with pore size preventing passage of particles 2 microns or larger.

2. A package according to claim 1 in which the upper web comprises polyethylene terephthalate and heat sealable polypropylene.

3. A package according to claim 1 in which the upper web comprises polyethylene terephthalate and heat-sealable and high molecular weight polyvinyl acetate.

4. A package according to claim 2 in which the polyethylene terephthalate has a thickness of approximately one half mil and the polypropylene has a thickness of approximately 1 to 1½ mils.

5. A package according to claim 3 in which the polyethylene terephthalate has a thickness of approximately one half mil and the polyvinyl acetate has a thickness of approximately 0.2 mil.

6. A sterilizable heat-sealed package for articles requiring sterile packaging, comprising an upper laminated or coated web of a dimensionally stable plastic material and a heat-sealable material, and a lower web of sterilant permeable material, the shrinkage of the package at 300° F. being no greater than 3 percent.